Feb. 24, 1931. H. A. DENMIRE 1,793,843
STOCK PICK-UP AND HANDLING MECHANISM
Filed Sept. 30, 1929 2 Sheets-Sheet 1
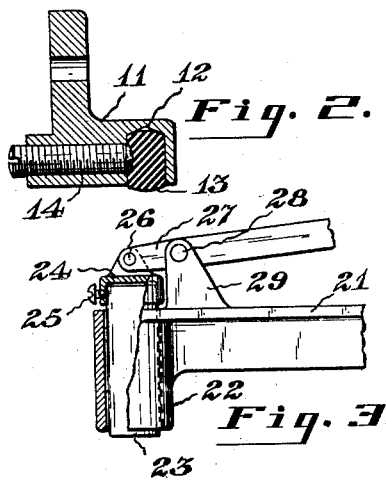
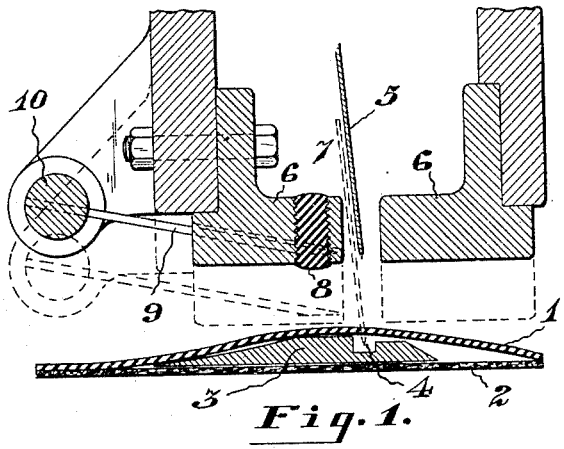
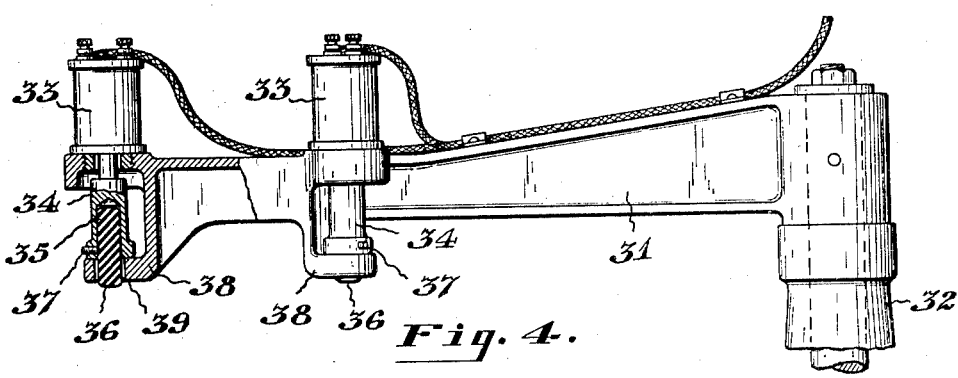
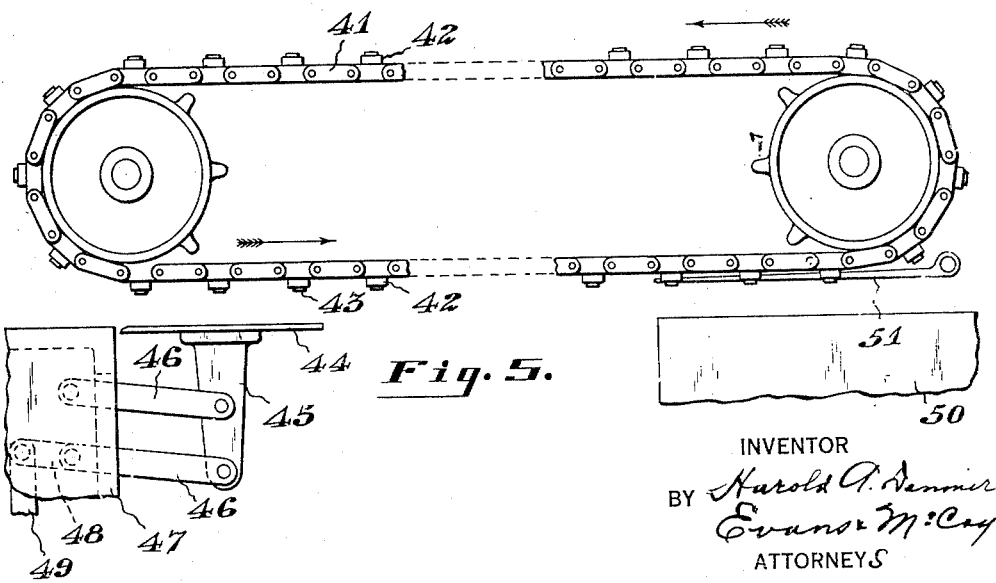
INVENTOR
BY Harold A. Denmire
Evans & McCoy
ATTORNEYS

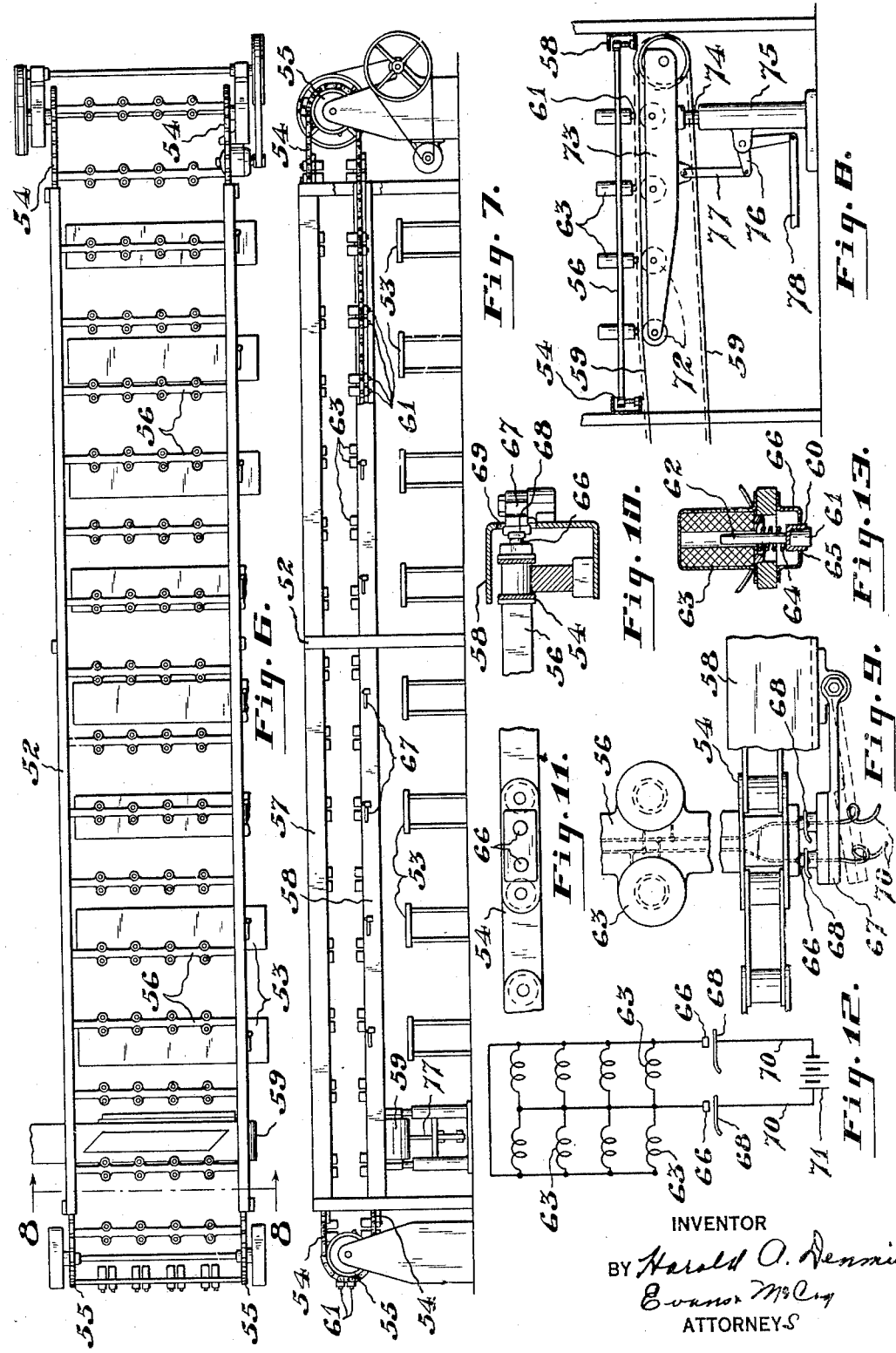

Patented Feb. 24, 1931

1,793,843

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

STOCK PICK-UP AND HANDLING MECHANISM

Application filed September 30, 1929. Serial No. 396,122.

This invention relates to stock handling mechanisms and particularly to pick-up mechanisms for use in handling articles composed of tacky material such as unvulcanized or partially vulcanized rubber articles or articles formed of fabric impregnated or coated with rubber.

Considerable difficulty has heretofore been experienced in the mechanical handling of pieces composed of tacky material such as rubberized fabric and the like and the present invention has for its object to provide a pick-up device by means of which such articles may be handled more efficiently.

A further object is to provide a device wherein the degree of adhesion of the articles to the pick-up member may be adjusted.

With the above and other objects in view, the invention may be said to comprise a device as illustrated in the accompanying drawings hereinafter described and particularly set forth in the appended claims, together with such variations and modifications thereof as will be apparent to one skilled in the art to which the invention appertains.

In my copending application Serial No. 190,756, filed May 12th, 1927, which has matured into Patent No. 1,731,713, there is disclosed a fabric cutting machine employing the pick-up device of the present invention.

The present invention is a continuation in part of said co-pending application.

Referring to the accompanying drawings, Fig. 1 is a sectional view showing the invention applied to fabric cutting machines.

Fig. 2 is a detail sectional view showing a modified form of pressure foot and pick-up member for use in a fabric cutting machine.

Fig. 3 is a fragmentary side elevation partially in section showing a modified form of pick-up device.

Fig. 4 is a side elevation partially in section showing a further modification of the invention.

Fig. 5 is a side elevation showing a conveyor embodying the invention.

Fig. 6 is a plan view of a conveyor embodying the invention.

Fig. 7 is a side elevation of the conveyor shown in Fig. 6.

Fig. 8 is a section taken on the line indicated at 8—8 in Fig. 6.

Fig. 9 is a fragmentary detail view showing one of the work station switches.

Fig. 10 is a fragmentary vertical section through the conveyor guide rail showing the manually operable switch.

Fig. 11 is a fragmentary side elevation of the conveyor chain to which the terminals of the solenoid circuits are attached.

Fig. 12 is a wiring diagram showing a solenoid operating circuit.

Fig. 13 is a vertical section showing the mounting of a pick-up member and its actuating solenoid on the conveyor cross-bar.

Referring to Fig. 1 of the drawing, a sheet of tacky material such as rubberized fabric is designated by the reference numeral 1 and is supported upon a suitable conveying belt 2. The sheet of fabric is guided over a cutter bar 3 which extends across the top surface of the belt 2 and which is provided with a groove 4 to receive a knife 5 employed for severing the fabric. Presser feet 6 are mounted upon opposite sides of the knife 5 and are movable toward and from the belt into and out of engagement with the fabric resting on the cutter bar 3, the presser feet 6 engaging the bar 3 on opposite sides of the groove to clamp the fabric during the cutting operation.

One of the presser feet 6 serves also as a pick-up member to lift the fabric off of the bar 3 after each cut and this presser foot is provided with a threaded socket 7 in which is mounted a rubber plug 8 which protrudes slightly below the lower engaging face of the presser foot and serves as an adhesion plug to which the tacky material will firmly adhere. The plug 8 may be adjusted by turning in the threaded socket 7 to vary the protrusion of the plug below the engaging face of the presser foot to thereby vary the adhesion of the tacky material to the engaging face.

In order to free the tacky material from the pick-up member, stripper arms 9 are provided, which extend alongside the presser feet 6 and which are attached to a rock shaft 10 so that they may be swung downwardly to brush the adhering fabric away from the presser feet and free the same from the plug.

In Fig. 2 of the drawing, there is shown a modified form of pick-up member in which a presser foot 11 is provided with a cylindrical socket 12 which receives a cylindrical plug of rubber 13 which is engaged by a laterally extending screw 14 by means of which the plug may be compressed in the socket causing the lower end of the plug to bulge outwardly to a greater or lesser extent as may be desired to vary the adhesion to the tacky fabric.

The present invention is applicable generally to the handling of tacky stock such as articles formed of or coated with raw rubber. In Fig. 3 of the drawing, there is shown a pick-up device associated with a movable arm 21 by means of which the stock may be transferred from one point to another. The arm 21 is provided at its outer end with a boss 22 which has a vertical bore in which is slidably mounted a cylindrical rubber plug 23, which is secured at its upper end in a holder 24 by means of a set screw 25. The holder 24 is connected by means of a pivot 26 to the outer end of a vertically swinging lever 27 which is pivoted at 28 to a bracket 29 carried by the arm 21. By means of the lever 27, the plug 23 may be moved to a position in which it protrudes from the lower end of the boss 22 for engagement with the stock, and when it is desired to release the stock, the plug may be moved upwardly by means of the lever 27 to a position in which its lower end is above the lower end of the boss 22, so that an article adhering to the plug 23 will be freed therefrom by engagement with the lower end of the boss 22.

Fig. 4 of the drawing shows the invention applied to a stock handling device which consists of a swinging arm 31 pivoted to the upper end of a standard 32. At the outer end thereof, the arm 31 carries a plurality of solenoids 33 which have vertically disposed plungers 34 provided with sockets 35 at their lower ends. In the sockets 35, there are mounted rubber plugs 36 which protrude from the lower ends of the sockets, the plugs 36 being held in the sockets by means of set screws 37. The arms 31 are provided with integral brackets 38 which underlie the plungers 34 and which have apertures 39 to receive the plugs 36. The plungers 34 normally rest on the brackets 38 and the plugs 36 protrude through the apertures 39 for engagement with articles of tacky material suitably supported beneath the arm. When the solenoids are actuated, the plungers 34 are lifted and the plugs 36 are drawn up through the apertures 39 so that articles adhering to the plugs 36 are stripped therefrom by engagement with the brackets 38.

The device shown in Fig. 4 may be employed to transfer articles of tacky material laterally from one support to another, the plugs 36 being caused to engage with an article by deenergizing the solenoids and allowing the plungers to drop to their lowermost position where the plugs 36 are in position to be engaged by the article to be transferred so that the article will adhere to and be supported by the plugs 36. The arms 31 may then be swung laterally until the article held by the plugs is positioned over the point at which it is desired to deposit the article whereupon the solenoids will be energized to lift the plugs 36 through the apertures 39 and strip the article from the adhesion plugs.

In Fig. 5 of the drawing, the invention is shown applied to a conveyor in the form of an endless link belt 41 carrying spaced sockets 42 in which are mounted rubber adhesion plugs 43. Beneath the under run of the conveyor there is mounted a suitable supporting table 44 which is adjustable vertically by means of a pedestal 45 and parallel links 46 connecting the pedestal with a stationary support 47. The links 46 may be swung vertically by means of an actuating arm 48 connected with one of the links and actuated through a link 49 extending to a treadle or other suitable operating device. By elevating the table 44 with an article composed of tacky material thereon, the article will be brought into engagement with the adhesion plugs 43 of the conveyor and caused to adhere thereto so that the article will be transferred laterally from the table by the conveyor. Articles taken by the conveyor from the table 44 may be deposited at a suitable receiving station 50 by means of stripper arms 51 which are mounted on a fixed support and extend along the under-run of the conveyor straddling the sockets 42. As the conveyor blade moves past the stripper arms 51, the article held by the adhesion plugs 43 engages the bottom faces of the bars 51 and is freed from the plugs and deposited at the station 50.

In Figs. 6 to 13 of the drawing the invention is shown applied to an endless conveyor 52 for delivering material to a series of work tables 53. In this machine the endless conveyor 52 consists of a pair of parallel endless chains 54 running over end sprockets 55 and having cross bars 56 connecting the chains at intervals, the upper and lower runs of the chains being supported between the sprockets in channel guide rails 57 and 58. The conveyor is designed to pick up articles of tacky material from an endless belt conveyor 59 which extends beneath one end of the conveyor 52 and to deliver the articles to the work tables 53.

Each of the cross bars 56 is provided with a suitable number of pick-up devices, each consisting of a vertically movable plunger 60 having a socket at its lower end in which an adhesive plug 61 of raw or partially vulcanized rubber is secured. The plunger 60 has a stem 62 which forms the armature of a solenoid 63 and each plunger 60 is normally held in its lowermost position by means of a spring 64. The lower end of each plunger projects through an aperture 65 in a guard 66 formed of a metal such as brass with a polished bottom face to which the tacky material does not strongly adhere. To discharge an article of tacky material from the holding means the solenoids 63 on the cross bar are simultaneously energized to lift the plugs 61 through the apertures 65 of the guard to free the article adhering thereto, which drops upon the table 53 beneath the cross-bar.

Means is provided at each work station for causing actuation of the solenoids to discharge articles from the conveyor 52 to the table 53 and this means is preferably under the control of the operator. The solenoids of each cross-bar are connected in an electric circuit which, as shown in Fig. 12, has terminals 66 which, as shown in Figs. 9, 10 and 11, are in the form of contacts mounted on the outer side face of the chain link to which the cross-bar is attached at one end. The terminals or contacts 66 project laterally from the face of the link and at each work station there is provided a manually operable switch arm 67 which has inwardly projecting spaced contact shoes 68 which are moved through apertures 69 in the chain guide rail 58 when the switch arms are swung inwardly to a position in which they will be engaged by the contact members 66. The contact shoes 68 of each switch are connected by wires 70 to opposite terminals, a suitable source of current, such as the battery 71 shown in Fig. 12, completing the circuit through the solenoids 63 to cause discharge of the article carried by the cross-bar to the table directly beneath the same.

As shown in Fig. 8, the portion of the endless belt conveyor 59 beneath the conveyor 52 is mounted for vertical adjustment, being supported on a bed of rollers 72 carried by a horizontal frame 73 carried by vertical posts 74 mounted for vertical movement in suitable tubular guides 75. The frame 73 may be raised by means of a bell crank lever 76 connected by a link 77 to the frame and by a link 78 to a suitable actuating device. Assuming that an article, such as a piece of tacky fabric, is resting on the portion of the conveyor belt carried by the rollers 72, the raising of the frame 73 will press the piece of tacky material against the adhesion plugs 61, causing the said piece of tacky material to adhere to the plugs and to be freed from the conveyor belt when the belt is lowered.

In all the modifications above described, the tacky stock is handled by means of pick-up members provided with protruding adhesion plugs to which the tacky material will firmly adhere and from which the articles may be easily stripped.

The stock engaging ends of the rubber plugs can be quickly and easily buffed to obtain a smooth engaging surface and to remove any tacky material adhering thereto.

It will be apparent that the present invention provides a very simple and efficient device for handling articles of tacky material and that this device may be used for a great many different handling operations.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In a stock handling machine, a support for articles composed of a tacky material, a pick-up member having a face engageable with an article carried by the support, means carried by said pick-up member for increasing the adhesion of the tacky material to the face of the member, and means for forcibly separating an article from said pick-up member.

2. In a stock handling machine, a support for articles composed of a tacky material, a pick-up member having a face engageable with an article carried by the support, means carried by said pick-up member for increasing the adhesion of the tacky material to the face of the member, said means being adjustable to vary the adhesion of the tacky material to the pick-up member, and means for forcibly separating an article from said pick-up member.

3. In a stock handling machine, a support for articles to be transferred, a pick-up member having a face engageable with an article carried by the support, an adhesion plug mounted in the engaging face of the pick-up member and composed of a material to which said articles will firmly adhere, and means for forcibly separating an article from said pick-up member.

4. In a stock handling machine a support for articles to be transferred, a pick-up member having a face engageable with an article carried by the support, an adhesion plug mounted in the engaging face of the pick-up member, and composed of a material to which said articles will firmly adhere, means for adjusting said plug inwardly and outwardly with respect to the face of the pick-up member to decrease or increase the adhesion of the articles thereto, and means for forcibly separating an article from said pick-up member.

5. In a machine for handling articles composed of a tacky material, a pick-up member having a rubber adhesion plug for engagement with said article, and means for forcibly separating an article from the pick-up member.

6. A pick-up device comprising a movable pick-up member having a socket therein, and a rubber adhesion plug fitting in said socket and protruding therefrom.

7. A pick-up device comprising a movable pick-up member having a socket therein, a rubber adhesion plug fitting in said socket and protruding therefrom, and means for compressing said plug to adjust the protruding end of the plug.

In testimony whereof I affix my signature.

HAROLD A. DENMIRE.